United States Patent [19]
Dillon

[11] 3,797,068
[45] Mar. 19, 1974

[54] FOWL AGITATING AND WETTING SYSTEM

[75] Inventor: Janus J. Dillon, Irving, Tex.

[73] Assignee: Food Equipment, Inc., Dallas, Tex.

[22] Filed: Apr. 6, 1972

[21] Appl. No.: 241,773

[52] U.S. Cl. ........................... 17/11, 17/51
[51] Int. Cl. ............................... A22b 3/08
[58] Field of Search ............ 17/11, 11.1 R, 11.2, 47, 17/51

[56] References Cited
UNITED STATES PATENTS

| | | | |
|---|---|---|---|
| 2,557,335 | 6/1951 | Barker | 17/11.1 R X |
| 3,541,636 | 11/1970 | Crane | 17/11.1 R X |
| 2,782,457 | 2/1957 | Lentz et al. | 17/47 |
| 3,537,128 | 11/1970 | Zebarth et al. | 17/11.1 R |

Primary Examiner—Louis G. Mancene
Assistant Examiner—D. L. Weinhold
Attorney, Agent, or Firm—Richards, Harris & Medlock

[57] ABSTRACT

The specification discloses a fowl agitating and wetting system including a pair of generally horizontally disposed wetting drums rotatably mounted on opposite sides of a path defined within a housing for passage of fowl therethrough. Each drum is hollow and rotatably connected to a source of hot fluid which is delivered to the interior of the drum. A plurality of flexible agitating fingers extend from the surface of each drum. Some of the fingers are solid and some are hollow and in communication with the fluid within the drum. The hollow fingers include transverse ridges having slits through the surface thereof which are closed when the finger is straight and open when the finger is bent. When the drums are rotated about their axes the fingers strike the carcasses of fowl transported therebetween so that the feathers are pulled away from the body and, at the same time, the bent hollow fingers dispense scalding fluid onto the skin of the fowl to efficiently loosen the feathers.

11 Claims, 13 Drawing Figures

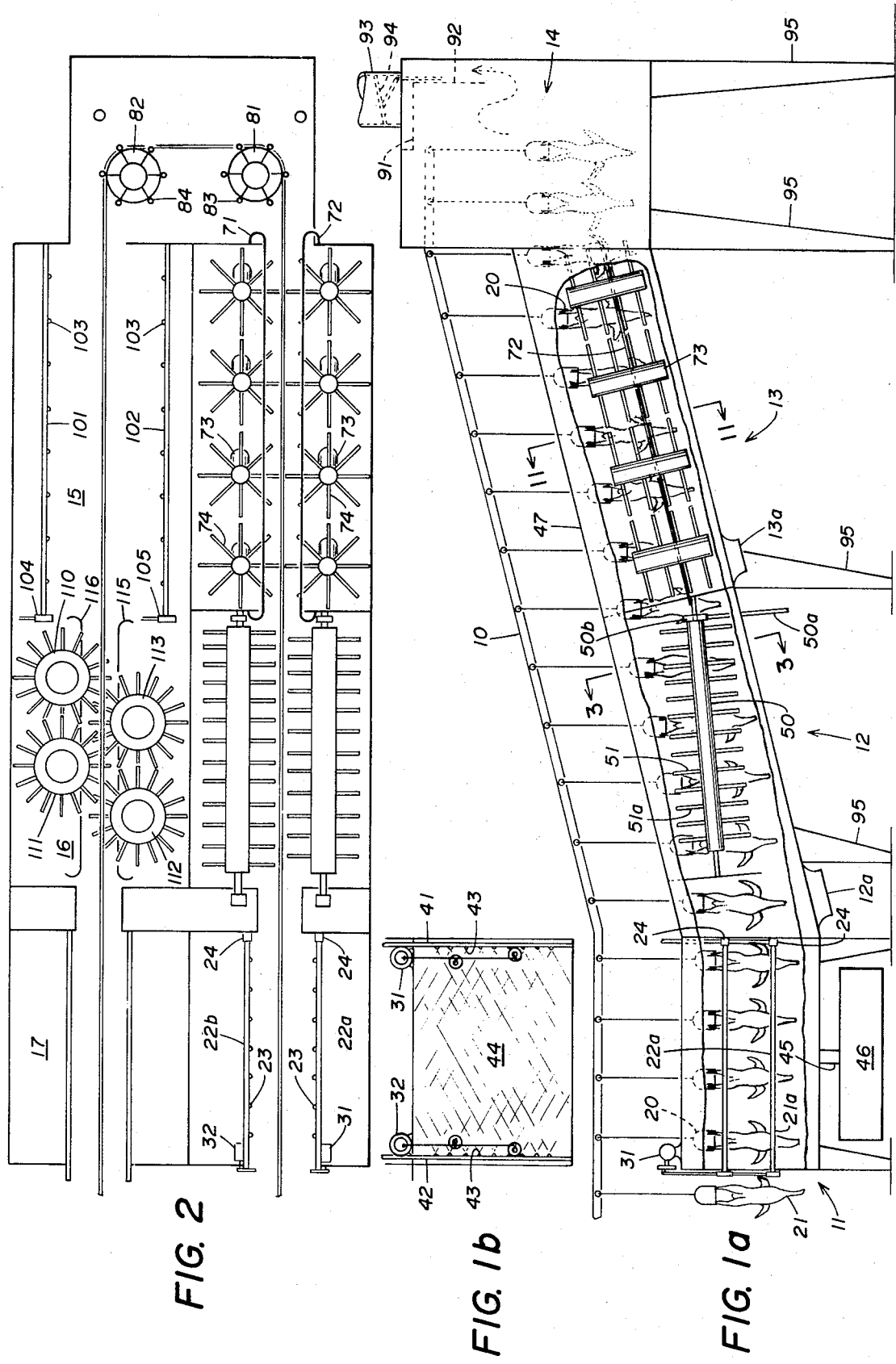

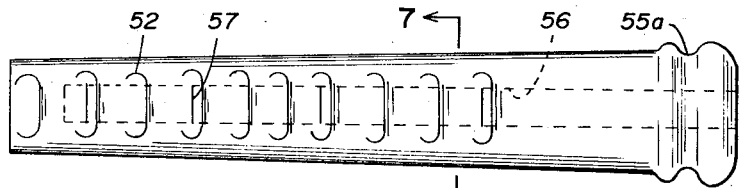
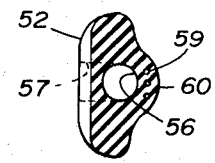
FIG. 6   FIG. 7
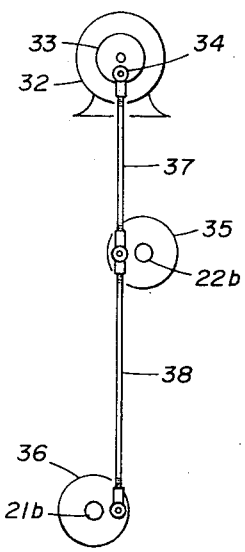
FIG. 1c
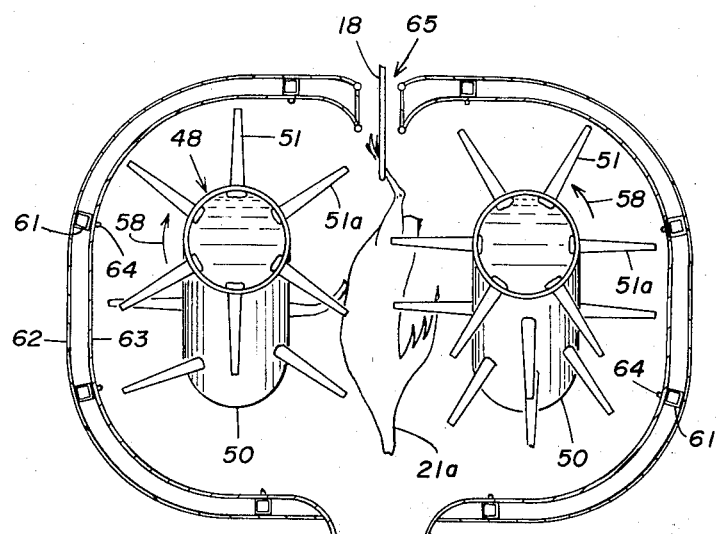
FIG. 3
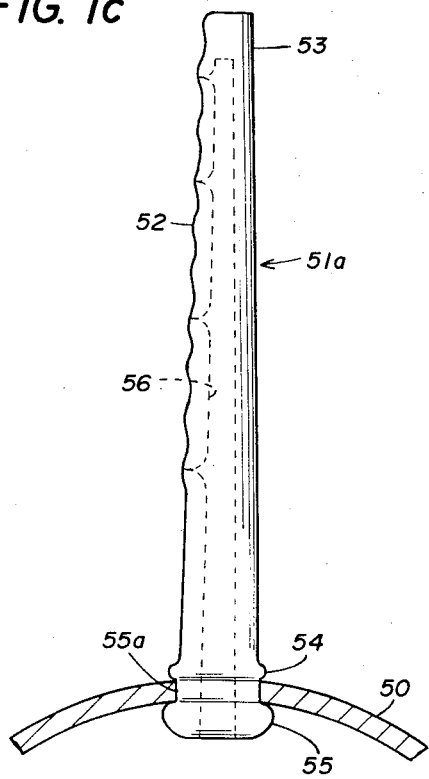
FIG. 4
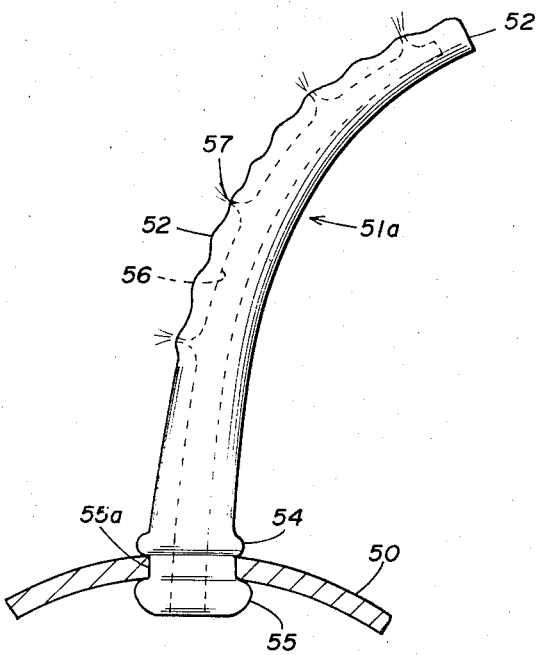
FIG. 5

PATENTED MAR 19 1974　　3,797,068

FOWL AGITATING AND WETTING SYSTEM

RELATED APPLICATIONS

This invention is related to the following co-pending patent applications: an application entitled FOWL WETTING AND DEFEATHERING SYSTEM, filed on even date herewith in the names of Clarence G. Dawson and Janus J. Dillon, and an application entitled CONTOURED FOWL DEFEATHERING SYSTEM, filed on even date herewith in the names of Bryan T. Snowden, Clarence G. Dawson and Janus J. Dillon. Each of the above co-pending applications are assigned to the assignee of the present invention.

FIELD OF THE INVENTION

This invention relates to apparatus for treating fowl prior to defeathering, and more particularly to a device for agitating the fowl and wetting the surface of the skin adjacent the base of the feathers.

THE PRIOR ART

In processing fowl as an uncooked food product, it is necessary to treat the fowl in order to loosen the feathers thereon preparatory to mechanical defeathering. Systems which have heretofore been developed for loosening feathers have employed such techniques as immersing the fowl in tanks of scalding water or passing the fowl through a chamber wherein steam and scalding water are sprayed upon the fowl.

In such prior systems, problems have arisen in achieving thorough feather loosening due to the fact that only a small amount of the heated water reaches the actual junction point between the skin of the fowl and the feathers. The present agitating and wetting system insures that hot water reaches the skin of the fowl at the base of the feathers so that they are more efficiently loosened prior to mechanical defeathering.

SUMMARY OF THE INVENTION

In accordance with the invention, a fowl agitating and wetting system is provided which is simple to construct and operate and yet which provides efficient operation with excellent wetting capability. The present invention utilizes flexible, hollow agitating fingers connected to a source of hot fluid to increase wetting efficiency.

In accordance with one aspect of the invention, a fowl agitating and wetting drum is provided having flexible fingers extending from the sides. At least a portion of the fingers are hollow and have apertures therein to dispense fluid when the fingers are bent. When the drum is rotated about its axis the fingers strike the fowl and thereby pull the feathers away from the skin. Scalding water is projected from the bent apertured fingers against the skin of the fowl at the base of the feathers.

In accordance with another aspect of the invention, a flow agitating and wetting system includes a pair of horizontally disposed rotatable drums having flexible agitating fingers extending from the sides. Each of the drums are hollow and attached to a source of hot fluid. At least a portion of the fingers are hollow and connected to the interior of the drums. The follow fingers have transversely extending apertures therein to dispense fluid when the fingers are bent. When the drums are rotated about their axes the fingers strike the fowl transported therebetween and pull the feathers away from the skin. Scalding water from within the drums is projected from the bent apertured fingers against the skin of the fowl to efficiently wet and loosen the feathers.

BRIEF DESCRIPTION OF THE DRAWING

For a more complete understanding of the present invention and for further objects and advantages thereof, reference may now be had to the following description taken in conjunction with the accompanying drawing in which:

FIG. 1a is a side view of a fowl wetting and defeathering system with portions of the sides cut away and within which the fowl agitating and wetting system of the invention is employed;

FIG. 1b is a front view of the entrance way into the system of FIG. 1a;

FIG. 1c is a diagrammatic view of an apparatus for oscillating spray conduits used in the system of FIG. 1a;

FIG. 2 is a top view of the system shown in FIG. 1a with the top portion of the housing removed;

FIG. 3 is a cross section view taken at lines 3—3 of FIG. 1a, showing the fowl agitating and wetting system of the invention;

FIG. 4 is a side view of one of the wetting fingers of FIG. 3 shown with the finger unflexed;

FIG. 5 is a side view of the finger of FIG. 4 shown with the finger bent;

FIG. 6 is a front view of the finger of FIG. 4;

FIG. 7 is a cross section view of the finger of FIG. 6 taken at lines 7—7;

FIG. 11 is a cross section view taken at the lines 11—11 of FIG. 1a.

DESCRIPTION OF THE PREFERRED EMBODIMENT

Figure 8:
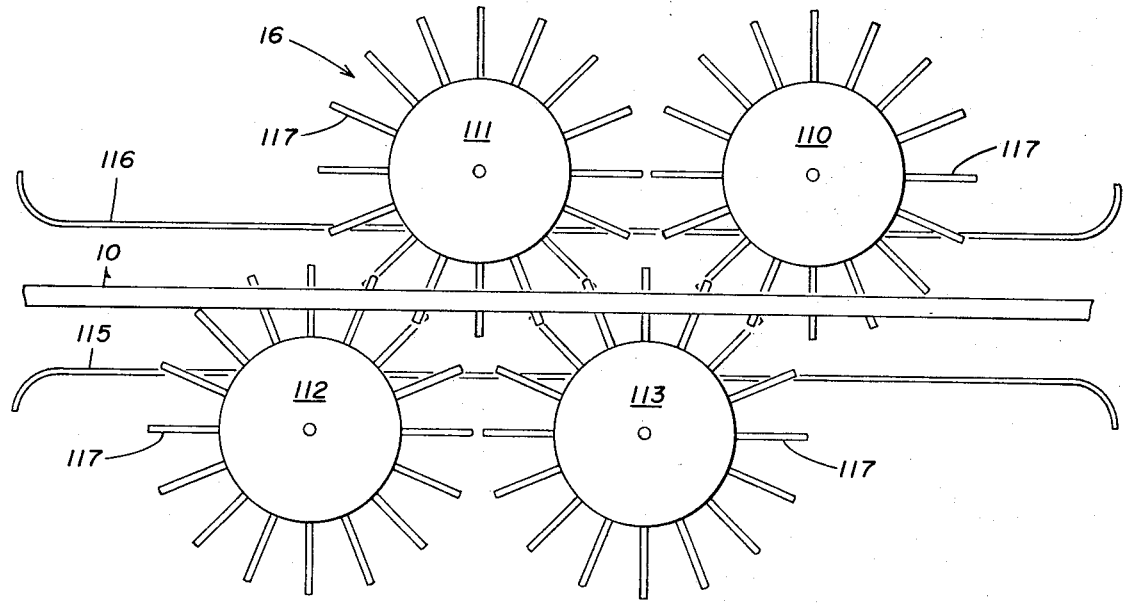
FIG. 8 is a top view of a fowl defeathering system used in conjunction with the invention.

Referring now to FIG. 1a, there is shown a side view of a fowl wetting and defeathering system. A conventional overhead roller-chain conveyor 10 extends along a predetermined path through a prewetting station 11, scalding and wetting stations 12, 13 and 14, a steaming station 15, a plucking station 16 and a washing station 17. A plurality of pivoted shackles 20 are spaced along the length of the conveyor 10 and animal carcasses 21 are suspended therefrom for moving along the path of the conveyor 10. It will be understood that the present invention is useful for the processing of animal carcasses other than fowl, such as for pretreating hog carcasses prior to dehairing operations. In the preferred embodiment, for simplicity of illustration, the processing of fowl will be described hereafter.

As shown in FIGS. 1a and 2, the prewetting station 11 comprises a chamber open at opposed ends and includes two pair of fluid conduits 21a–b and 22a–b. A plurality of spray nozzles 23 are spaced along the length of the conduits 21a–b and 22a–b. The conduits are connected through rotary connections 24 to a pressurized source of hot fluid such as water. The fluid is maintained at a temperature of between 120° – 175° F., and preferably within the range of 125° – 160° F. The hot fluid is forced from the spray nozzles 23 for impingement upon the bodies of the fowl as they are carried therethrough by the overhead conveyor 10.

Each of the conduits 21a and 22a and 21b and 22b are mounted for pivotal or nutating movement and are oscillated by electric motors 31 and 32 through off-center crank arrangement, one of which is illustrated in FIG. 1c. As shown in FIG. 1c, the electric motor 32 drives a crank member 33 having a rotatably mounted pin 34 extending from the front face near the edge. The pin 34 is connected to a pair of circular members 35 and 36 by means of adjustable shafts 37 and 38. The centers of each of the circular members 35 and 36 are attached to conduits 21b and 22b which extend through the circular members to the rotary fluid connections 24 (FIG. 1a). The lengths of the shafts 37 and 38 can be varied to adjust the rate and the arc of oscillation of the conduits. As the crank member 33 is rotated by the motor 32, the conduits 21b and 22b are oscillated in opposite directions so that while one conduit is spraying the lower part of the fowl the other conduit is spraying the upper part of the fowl. The conduits 21a and 22a are driven by the motor 31 through an eccentric crank arrangement identical to that shown in FIG. 1c. Preferably, the conduits oscillate between 15 and 75 complete cycles per minute. In place of the electric motors, 31 and 32, the conduits may be powered by motors driven by the high pressure water, steam, or air.

The purpose of the prewetting spray is to wash loose feathers, dirt and other debris from the fowl prior to their entering the main housing of the apparatus. Also, the hot fluid pretreats the feathers and tends to make the subsequent operations more efficient. It should be further noted that the prewetting station 11 serves as an excellent shackle washer and sterilizer when empty shackles are passed through it and high temperature water is sprayed upon the shackles.

FIG. 1b illustrates a front view of the entrance to the prewetting station 11. The entrance includes a pair of vertically oriented conduits 41 and 42 positioned along opposite edges of the entranceway. Each of the conduits 41 and 42 includes a plurality of spray nozzles 43 positioned along the inside portions to direct a spray of water toward the opposite conduit and form a water curtain 44 through which the fowl are carried by movement of the conveyor 10. The curtain 44 serves to enclose the prewetting station 11 and prevent the escape of heat and moisture therefrom.

Referring again to FIG. 1a, the hot water sprayed upon the fowl by the conduits 21a-b and 22a-b and the curtain 44 is collected in the bottom portion of the stations and drained through a conduit 45 into a water collection reservoir 46. The collected water is preferably filtered to remove the debris collected therein and recirculated.

After passage through the prewetting station 11, the fowl are conveyed to the inlet side of a generally rectangular chamber 47 comprising the wetting station 12 wherein the fowl are subjected to treatment by the agitating and wetting system of the invention. The system, referred to generally by the character 48, comprises a pair of hollow drums 50 mounted for rotation about their ends and which include a plurality of flexible fingers 51–51a which strike the bodies of the fowl as they are carried by the conveyor 10. The drums are connected to a source of hot fluid, such as water, through rotary connections 50b.

Referring to FIG. 3, there is shown a cross-sectional view of the wetting station 12 illustrating the fowl agitating and wetting system of the invention. Each drum 50 is hollow and rotatably mounted at one end for rotation about its longitudinal axis. As stated above, the other end is connected by a conduit 50a to a source of scalding hot water through a rotary connection 50b (FIG. 1a). The longitudinal axes of the drums 50 extend in a generally horizontal direction inclined slightly upwardly toward the second scalding and wetting station 13. Certain ones of the fingers 51 are formed of solid rubber while others, 51a, are hollow water dispensing fingers, as shown in FIG. 4. The number and arrangement of solid fingers and hollow water dispensing fingers is dependent upon the individual requirements of a particular system and may be changed as needed. Both the solid fingers 51 and the hollow water dispensing fingers 51a include transversely extending, spaced apart rib portions 52, best shown in FIGS. 4 and 6, which provide firm engagement when the fingers contact the feathers on the fowl.

As shown in FIGS. 4–6, the water dispensing fingers 51a include an elongate flexible portion 53 which is mounted through an aperture in the drum 50 by means of a pair of ridges 54 and 55 which define an annular groove 55a so that a virtually water-tight seal is formed therebetween. The fingers 51a also include a hollow portion 56 which extends longitudinally from the end joined to the drum 50 to just short of the tip end of the flexible portion 53. A plurality of fluid dispensing apertures such as slits 57 are formed in a transversely extending direction across certain ones of the ribs 52. The slits 57 extend through the surface of the flexible portion 53 and are joined with the hollow portion 56. When the water dispensing fingers 51a is unflexed, as shown in FIG. 4, the slits 57 are closed so that very little water escapes from the hollow portion 56 to the outside of the finger. However, when the finger 51a is bent, as shown in FIG. 5, the slits 57 are opened so that the water from within the drum 51 passes through the slits and impinges on the body of the fowl.

Referring to FIG. 7, a cross section view of one of the hollow fingers 51a is shown, illustrating the hollow portion 56, a rib 52 and a slit 57 therethrough. The finger 51a is stiffened by a plurality of longitudinally extending reinforcing members, such as fibers 59, which are embedded within a longitudinally extending rib 60.

As shown in FIG. 3, the drums are rotated, respectively, in the direction of the adjacent arrows 58 so that the fingers on opposed drums move inwardly and downwardly in the opposite direction from which the feathers on the fowl 21a grow. As shown, when the water dispensing fingers 51a are bent, such as finger 51a–1, water is dispensed through the openings in the fingers and sprayed onto the fowl and beneath the feathers. Both the hollow and solid flexible fingers pull the feathers away from the body of the fowl so that scalding water reaches the skin where the feathers are attached and loosens them. The flexible fingers may, in addition, partially pluck the fowl as the fingers strike the body.

It is to be noted that not all of the fingers attached to the drums 50 are of the hollow water dispensing variety. Some of the fingers 51 are solid and serve to pull the feathers away from the body so that scalding water reaches the skin and further serve to partially pluck the fowl as they strike the body.

The fowl agitating and wetting drums of the invention result in improved wetting of a fowl passed therebetween, particularly in the area of the fowl carcass to which the feathers are attached.

Referring again to FIG. 3, the housing 47 surrounding the wetting station 12 includes a plurality of rectangular conduits 61 mounted between spaced wall portions 62 and 63. Each one of the conduits 61 has spaced therealong a plurality of nozzles 64 through which steam is injected into the wetting station to raise the temperature of the environment and further aid in loosening the feathers from the fowl. Each of the processing stations, including the wetting station 12, is totally enclosed by the housing 47 except for a longitudinally extending slit 65 which permits passage of a fowl supporting shackle 18 carried by the conveyor 10.

Figure 11:
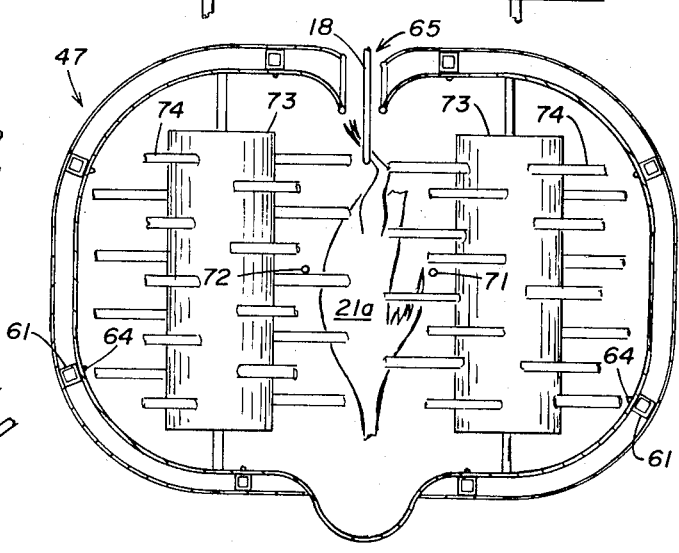

Referring to FIG. 1b, after the fowl pass through the first wetting station 12, they pass into the second scalding and wetting station 13. As the fowl are moved along on the conveyor 10, they pass along a pair of guide bars 71 and 72 which extend between a plurality of generally vertical, rotatably mounted drums 73 each of which have a plurality of solid flexible fingers 74 extending therefrom. As shown in FIG. 11, the drums 73 may be rotated in either direction so that the flexible fingers 74 strike the bodies of the fowl in a generally transverse direction. The housing 47 surrounding the wetting stations 13 is identical to that shown in FIG. 3, with steam and scalding water nozzles extending through the walls. The flexible fingers 74 on the drums 73 move the feathers about so that hot water reaches and thoroughly wets the skin of the fowl while at the same time plucking some of the feathers. As the fingers strike the fowl passing through the wetting station 13, the fowl are pressed against the guide bars 71 and 72 which prevent the fowl from being drawn into and between two of the drums 73.

The feathers which are removed from the fowl during wetting in both of the stations 12 and 13 are collected in the bottom of the housing and washed down the incline by the run-off scalding water. The feathers and other debris pass through an opening 12a in the bottom of the station 12 and an opening 13a in the bottom of the station 13. The feathers are collected in a disposal trough (not shown) from which they are periodically removed.

Referring to FIGS. 1a and 2, as the fowl move out from the second wetting station 13, they move into a turnabout station 14 wherein the conveyor is directed about a pair of rotating wetting wheels 81 and 82. The wheels 81 and 82 incorporate fluid applicators 83 and 84 which include nozzles for directing a hot fluid stream to the difficult-to-wet straddle areas of the fowl. The wheels 81 and 82 and other apparatus not shown in detail may be identical to the apparatus disclosed and claimed in co-pending patent application entitled SYNCHRONIZED PIN-POINT SPRAY FLUID APPLICATOR, Ser. No. 46,263, filed June 15, 1970, in the name of Janus J. Dillon. This application is assigned to the assignee of the present invention and is hereby incorporated herein as if set forth in detail.

The chamber 14 also includes a baffle plate 91 mounted at the upper rear portion and having a downwardly extending member 92 which is spaced from the back wall of the chamber. Above the baffle plate is included a duct stack 93 within which is mounted a damper 94. The structure and thermostatically controlled operation of the damper 94 is described in detail in U. S. Pat. No. 3,561,040. The baffle plate 91 prevents the hottest temperature steam medium from being directly exhausted through the duct stack 93 and has been found to substantially increase the temperature within the station 14 and to eliminate hot spots and the like.

Preferably, the majority of the structure of the system is formed of stainless steel metal. A plurality of support legs 95 securely supports the stations 12 and 13 at a prescribed angle of inclination to the horizontal. The inclined configuration of the stations assists in maintaining the desired internal temperature, as well as enables the system to be maintained in a sanitary condition. An internal temperature in the range of about 140° F. to 175° F. is very effective for bacteria destruction and loosening of the feathers from the bodies of the fowl. The system readily controls the desired heating temperature of within several degrees fahrenheit throughout essentially the entire length of the system. Thus, the fowl are subjected to a substantially constant and uniform predetermined temperature for the full U-shaped path of travel through the stations.

The temperature sensing and control system of the invention operates a motor, not shown, which controls the position of the damper 94. Upon sensing of an undesirable increase in the internal temperature within the station 14, the damper 94 is opened and ambient air enters through the openings 12a and 13a. The ambient air is drawn into the housing by convection and rapidly passes upwardly along the inclined chambers due to the draft created by the opening of the damper 94. The ambient air then passes out of the duct stack 93. It will be understood that in some instances a fan may be inserted in the stack 93 to cause a forced draft of the ambient air therethrough. This ambient air flow is in the same direction as the travel of the fowl during one segment of the generally U-shaped path through the system and in an opposite direction during the other segment of the path through the system. Such passage of ambient air rapidly reduces the temperature within the stations to the desired level, that temperature condition being sensed by the system which then operates to close the damper 94.

The upper inclination of the stations may vary between certain preferred limits so long as the angle chosen permits the rapid upward flow of ambient air as just described. Also, the inclination chosen is substantially less than vertical so that the housing will conserve floor space and yet will permit the system to be positioned in buildings having normal height ceilings.

Inclination in the range of from approximately 10° to approximately 40° relative to the horizontal has been determined as necessary for meeting the stated needs and to permit the apparatus to perform its desired objectives. An inclination falling within a narrower range of approximately 20° to 35° has been found preferable, with an inclination of approximately 20° being highly effective for insuring close temperature control while permitting the apparatus to conserve floor space and without creating any necessity to alter or raise the roof of any conventional building in which the apparatus is installed. Further, such inclination produces the desired results without adjacent fowl contacting each other and without requiring any modification in the shackle spacing of the conventional overhead conveyor.

The inclination of the stations has further advantages as the vaporized medium, particularly steam, sprayed from the nozzles in the walls of the stations will pass upwardly along the sides of the housing toward the stack 93 due to the draft created therethrough. This draft keeps the medium moving and prevents formation of hot spots in the housing, without requiring expensive circulation equipment for that purpose. Moreover, the inclination insures that feathers or other debris which is inadvertently carried into the housing with the fowl and which are removed from the fowl by the spray and contact of the water dispensing fingers with the bodies of the fowl will flow downwardly with the liquid toward the lower ends of the stations and out the openings.

When the fowl leave the turnabout station 14, they pass into another wetting station 15 which includes a pair of horizontally extending conduits 101 and 102. Both of the conduits include spray nozzles 103 mounted along facing surfaces thereof. The conduits 101 and 102 are rotatably mounted and coupled through rotary connections 104 and 105 to a pressurized source of hot fluid, such as water. The fowl pass by means of the conveyor 10 between the conduits 101 and 102. The conduits 101 and 102 are periodically oscillated through a preselected arc by means of a nutating motor and cam arrangement, not shown, which may be similar to that illustrated in FIG. 1c. Preferably, the conduits 101 and 102 are oscillated so that when one is applying hot water to the upper portion of the fowl, the other conduit is applying water to the lower portion of the fowl. The pressurized scalding water is applied directly to the skin next to the feathers to further loosen the feathers and prepare them for plucking.

Referring to FIG. 2, after passage from the wetting station 15, the fowl pass into the plucking station 16 which includes four vertically oriented, contoured defeathering drums 110-113. Each of the drums is rotatably mounted and includes a plurality of flexible plucking fingers 117 which extend from the sides thereof. The fingers 117 strike the bodies of the fowl passing therethrough as the drums are rotated to pluck the feathers from the carcasses. As shown in FIG. 2, the drums 110-113 are mounted so that the drum 110 is aligned with the region between the opposite drums 112 and 113, and the drum 113 is aligned with the region between the opposite drums 110 and 111.

Referring now to FIG. 8, there is shown a top view of the plucking station 16 and the contoured defeathering drums 111-113. The two drums 110 and 111 are spaced from the two drums 112 and 113 and the conveyor system 10 is arranged to carry shackle supported fowl through the path between the two sets of drums. A pair of restraining guide bars 115 and 116 extend between the two sets of drums to prevent a fowl being carried therethrough by the conveyor 10 from being drawn in between the drum and to hold the fowl in position during plucking.

Figure 9:
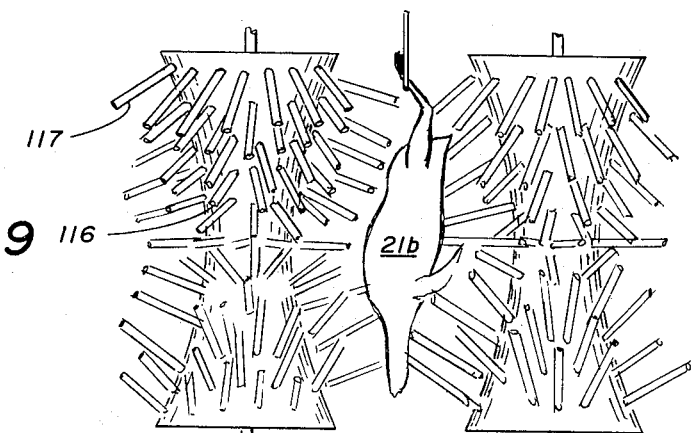
FIG. 9 is a front view of the fowl defeathering system of FIG. 8.

As best shown in FIG. 9, the walls of the drums are generally concavo-concave in longitudinal cross section with the sides being inwardly curved to a narrow restricted region 116 so that the central portion of each drum is narrower than the end portions. A plurality of flexible plucking fingers 117, which may comprise elongate rubber tubes, are mounted upon the side surface of each one of the drums. The fingers 117 extend substantially perpendicularly from the surface of the drum in the area to which they are attached and are staggered relative to one another to form inwardly curved sides. The contoured surfaces of the drums and the outermost ends of the fingers 117 define inwardly directed sides which conform generally to the shape of a fowl.

The defeathering drums are each rotatably mounted at opposite ends and connected to suitable driving sources such as electric motors (not shown). The drums are rotated about their longitudinal axes to bring the fingers 117 in contact with the body of a fowl 21b being transported through the region between the drums. The contoured sides of the defeathering drums, shown in FIG. 9, have been found to be particularly adapted to plucking of a fowl in that there is substantial contact between the body of the fowl and the many fingers 117, particularly in the head and tail area of the fowl.

Figure 10:
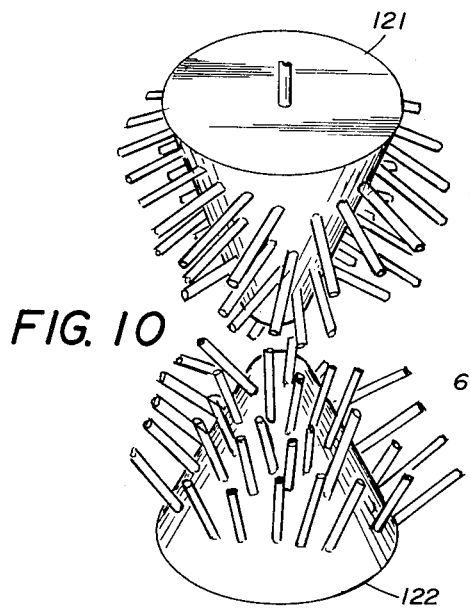
FIG. 10 is an alternate embodiment of the drum configuration for the fowl defeathering system of FIGS. 8 and 9.

As shown in FIG. 10, a further embodiment of a fowl defeathering drum comprises two generally cone shaped domes 121 and 122 rotatably mounted so that their axes are aligned. A plurality of plucking fingers 123 are fixed to extend perpendicularly from the surface of domes. Each one of the domes 121 and 122 are mounted for rotation about its axis. The domes may be rotated either in synchronism with one another or at different rates or in directions to provide for maximum contact of the fingers 123 with the feathers of the fowl. The domes 121 and 122 together form a contoured region adjacent their sides which conforms generally to the shape of a fowl. The use of separately rotatable domes enables the selection of more plucking finger contact on either the upper or lower portions and the carcass of the fowl as needed.

It will be seen that the fowl agitating and wetting system of the invention provides improved feather loosening capabilities. The use of flexible, hollow wetting fingers in the system of the invention produces thorough wetting of flow in the areas where the feathers are attached to the carcass thereby enabling more efficient defeathering.

Having described the invention in connection with certain specific embodiments thereof, it is to be understood that further modifications may now suggest themselves to those skilled in the art and it is intended to cover such modifications as fall within the scope of the appended claims.

What is claimed is:

1. Apparatus for wetting fowl comprising:
   drum means rotatable about its longitudinal axis;
   a plurality of flexible fingers attached about the sides of said drum means and having hollow portions,
   a plurality of normally closed apertures extending from said hollow portions to a side of said fingers, said apertures being opened when said fingers are bent; and
   means for supplying fluid to said hollow portions of said apertured fingers whereby said fingers dispense fluid from said apertures when bent by contact with a fowl.

2. The apparatus of claim 1 and further comprising: a plurality of ribs formed along said fingers.

3. The apparatus of claim 1 wherein said drum means is hollow and in communication with the hollow portion of said elongate flexible members and which also includes:
   means for supplying fluid to the hollow portion of said drum.

4. In a fowl wetting system having a hollow rotatable drum connected to a source of fluid, the combination comprising:
a flexible finger having end structure for attachment to said drum, said finger including a hollow fluid receiving portion and a plurality of apertures extending from said hollow portion to the exterior of said finger, wherein said apertures are closed when said finger is straight and are opened when said finger is bent.

5. The combination of claim 4 and further comprising:
a plurality of transverse ribs spaced apart along the length of said finger, said apertures extending through ones of said ribs.

6. The combination of claim 5 and further comprising:
a reinforcing member extending along the length of said finger on the side opposite said ribs.

7. The combination of claim 5 wherein said apertures comprise slits extending normally to the length of said finger.

8. A wetting and defeathering apparatus comprising:
a hollow drum rotatable about a longitudinal axis and including structure for receiving a supply of fluid;
a plurality of solid flexible fingers affixed at first locations on the sides of said drum;
a plurality of hollow flexible fingers affixed at second locations on the sides of said drum and in communication with the interior of said drum, to receive a supply of fluid;
each of said fingers including a plurality of apertures extending from the interior of said finger to the exterior thereof;
said apertures being normally closed when said fingers are linearly disposed and being stretched open to dispense fluid when said fingers are bent by contact with fowl.

9. The apparatus of claim 8 wherein said drum is generally horizontally disposed.

10. The apparatus of claim 8 and further comprising:
a plurality of transverse ribs extending along said fingers, said apertures extending through ones of said ribs.

11. The apparatus of claim 8 and further comprising:
apertures defined through said drum; and
annular grooves formed in the ends of said hollow fingers for being received within said apertures in said drum.

* * * * *

PO-1050
(5/69)

UNITED STATES PATENT OFFICE
CERTIFICATE OF CORRECTION

Patent No. 3,797,068          Dated March 19, 1974

Inventor(s) Janus J. Dillon

It is certified that error appears in the above-identified patent and that said Letters Patent are hereby corrected as shown below:

Col. 1, line 58, "flow agitating" should be --fowl agitating--.
Col. 2, line 51, "shackes 20" should be --shackles 20--.
Col. 4, line 36, "fingers 51a" should be --finger 51a--.
Col. 5, line 3, "area" should be --areas--.
Col. 6, line 16, "fpr bacteria" should be --for bacteria--.
Col. 8, line 16, "head and tail area" should be --head and tail areas--;
     line 38, "flow in the areas" should be --fowl in the areas--.

Signed and sealed this 24th day of September 1974.

(SEAL)
Attest:

McCOY M. GIBSON JR.
Attesting Officer

C. MARSHALL DANN
Commissioner of Patents